US008392885B2

(12) United States Patent
Stall et al.

(10) Patent No.: US 8,392,885 B2
(45) Date of Patent: Mar. 5, 2013

(54) LOW PRIVILEGE DEBUGGING PIPELINE

(75) Inventors: Jonathon Michael Stall, Bothell, WA (US); Charles P. Jazdzewski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 12/339,111

(22) Filed: Dec. 19, 2008

(65) Prior Publication Data

US 2010/0162049 A1 Jun. 24, 2010

(51) Int. Cl.
*G06F 9/44* (2006.01)

(52) U.S. Cl. .... 717/124; 717/129; 714/38.1; 714/38.13; 714/46

(58) Field of Classification Search .......... 717/124–129; 714/E11.21, E11.208, E11.217, 38.1, 38.13, 714/46

See application file for complete search history.

(56) References Cited

U.S. PATENT DOCUMENTS

| 6,119,247 | A  | * | 9/2000  | House et al. ............... 714/38.14 |
| 6,158,045 | A  |   | 12/2000 | You |
| 6,263,456 | B1 |   | 7/2001  | Boxall et al. |
| 6,324,683 | B1 | * | 11/2001 | Fuh et al. ...................... 717/124 |
| 6,550,056 | B1 |   | 4/2003  | Mizumoto et al. |
| 6,598,180 | B1 | * | 7/2003  | Dryfoos et al. ............. 714/38.13 |
| 7,873,872 | B1 | * | 1/2011  | Shillington et al. .......... 717/124 |
| 2003/0106046 | A1 |  | 6/2003 | Arnold et al. ............... 717/129 |
| 2003/0110476 | A1 |  | 6/2003 | Aihara |
| 2003/0167459 | A1 | * | 9/2003 | Bates et al. .................. 717/125 |
| 2005/0005088 | A1 | * | 1/2005 | Yearsley et al. .............. 712/235 |
| 2005/0013257 | A1 | * | 1/2005 | Garyfalos et al. ............. 370/252 |
| 2005/0138113 | A1 | * | 6/2005 | Brendle et al. ................ 709/203 |
| 2007/0168997 | A1 | * | 7/2007 | Tran .............................. 717/129 |
| 2007/0174715 | A1 | * | 7/2007 | Kilian ............................ 714/38 |
| 2007/0266392 | A1 | * | 11/2007 | Thoelke ........................ 719/313 |
| 2008/0077780 | A1 | * | 3/2008 | Zingher ........................ 712/227 |
| 2008/0126812 | A1 | * | 5/2008 | Ahmed et al. ................ 713/189 |
| 2008/0141118 | A1 |  | 6/2008 | Arkhipov et al. |
| 2008/0235325 | A1 |  | 9/2008 | Calvert et al. |

OTHER PUBLICATIONS

Volodarsky Mike, "Debugging IIS 7.0 Web Applications Remotely with Visual Studio 2008", Retrieved at<<http://mvolo.com/blogs/serverside/archive/2008/02/20/Debugging-IIS-7.0-Web-applications-remotely-with-VisualStudio-2008.aspx>>, Apr. 8, 2008, pp. 1-4.

Datta Sandipan, "Debugging Client/Server Side Scripts ", Retrieved at<<http://www.serverwatch.com/tutorials/article.php/1549761>>, Jun. 6, 1999, pp. 1-4.

"Distributed Debugger", Retrieved at<<http://www.ncsa.uiuc.edu/UserInfo/Resources/Hardware/IBMp690/IBM/usr/ share/man/info/en_US/xIf/html/debugger/concepts/cbcdbovr.htm>>, Oct. 16, 2008, p. 1.

"Remote Debugging", Retrieved at<<http://www.ncsa.uiuc.edu/UserI nfo/Resources/Hardware/IBMp690/IBM/usr/share/man/info/en_US/xIf/html/debugger/concepts/cbwremdb.htm>>, Oct. 16, 2008, p. 1.

"Allinea DDT: The powerful scalable parallel debugging tool", Retrieved at<<http://www.allinea.com/?page=48>>, Oct. 16, 2008, pp. 1-2.

* cited by examiner

*Primary Examiner* — Lewis A Bullock, Jr.
*Assistant Examiner* — Tina Huynh

(57) ABSTRACT

A low privilege debug pipeline publisher advertises a debugging pipeline. Instead of having a client to which a debugger on the server has been attached interrogate the server for debugging information, the client requests information from the server. Control is returned to the server which can refuse to provide the requested information to the client. A debuggee server executes client code being debugged in an isolated context so that pausing the code at a breakpoint does not block the server. The server can apply transforms to compiled code to make the code cooperate with debugging services so that a privileged component to inspect the debuggee code is not needed.

9 Claims, 5 Drawing Sheets

LOW PRIVILEGE DEBUGGING PIPELINE

BACKGROUND

A debugger is a tool which enables a programmer to monitor the execution of a program. A debugger can stop execution of a program being debugged, re-start it, set breakpoints in the program, and/or access or change values in memory. A debugger can enable a program to be run step by step (called stepping), to stop at a particular line of code when a breakpoint is encountered (breaking) and can enable the value of variables to be inspected when the program is at a breakpoint or while the program is running (inspection). Some debuggers can also modify program state while the program is running, in addition to observing and reporting on program state. Hence, debuggers are typically very powerful. Moreover, the same functionality that makes a debugger useful for finding bugs also makes it useful as a software cracking tool to retrieve sensitive information, evade copy protection, circumvent digital rights management, and so on. Hence a debugger process is typically a highly privileged process.

When software running in a process is being debugged, other threads running in the process can be affected. For example, if a debugger is running on a server, clients accessing the server may experience a slow down in server response time or the application being debugged (and all the clients accessing the application being debugged) may even freeze.

SUMMARY

A server advertises a debugging pipeline that allows a client to make debugging requests instead of having a client interrogate the server for debugging information (commanding the server to provide information). Client-to-client debugging can be achieved via re-routing a first client to server to second client connection. Breakpoints in code can be implemented via debuggee code cooperation (by performing code transformations that halt execution of client code, transfer control back to the server and allow the server to assume a state in which it can service client debug requests), rather than by explicit debugger control. A debuggee server can execute code in an isolated context so that pausing the code at a breakpoint does not block the server. The server can run the script or source code in an isolated context such that the execution of the code being debugged does not block the rest of the server. A server can apply transformations to compiled code or to source code to make the code cooperate with debugging services so that a high privileged component to inspect the debuggee code is unneeded. (Traditional process-wide debugging techniques require a high privilege debugging component).

The server stays responsive when the script code is at a breakpoint by running the code in an appropriate isolation context and by using cooperative breakpoints as determined by the transformations to the source or script code. A server can advertise itself as a debuggee by publishing a debugging pipeline that a client debugger can consume. The server pipeline can filter out privileged information (e.g., credit card numbers) so that remote debugging can be performed securely. The debuggee (server) publishes a low privilege debug pipeline; instead of allowing the debugger to invade the debuggee and having full control over it, as in traditional debug models. This keeps the debuggee server secure; while still providing client debuggability. A client to client debugging connection may be established by establishing a first client to server connection, a second client to server connection and then optimizing the routing to remove the server from the communication channel, enabling the clients to communicate directly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
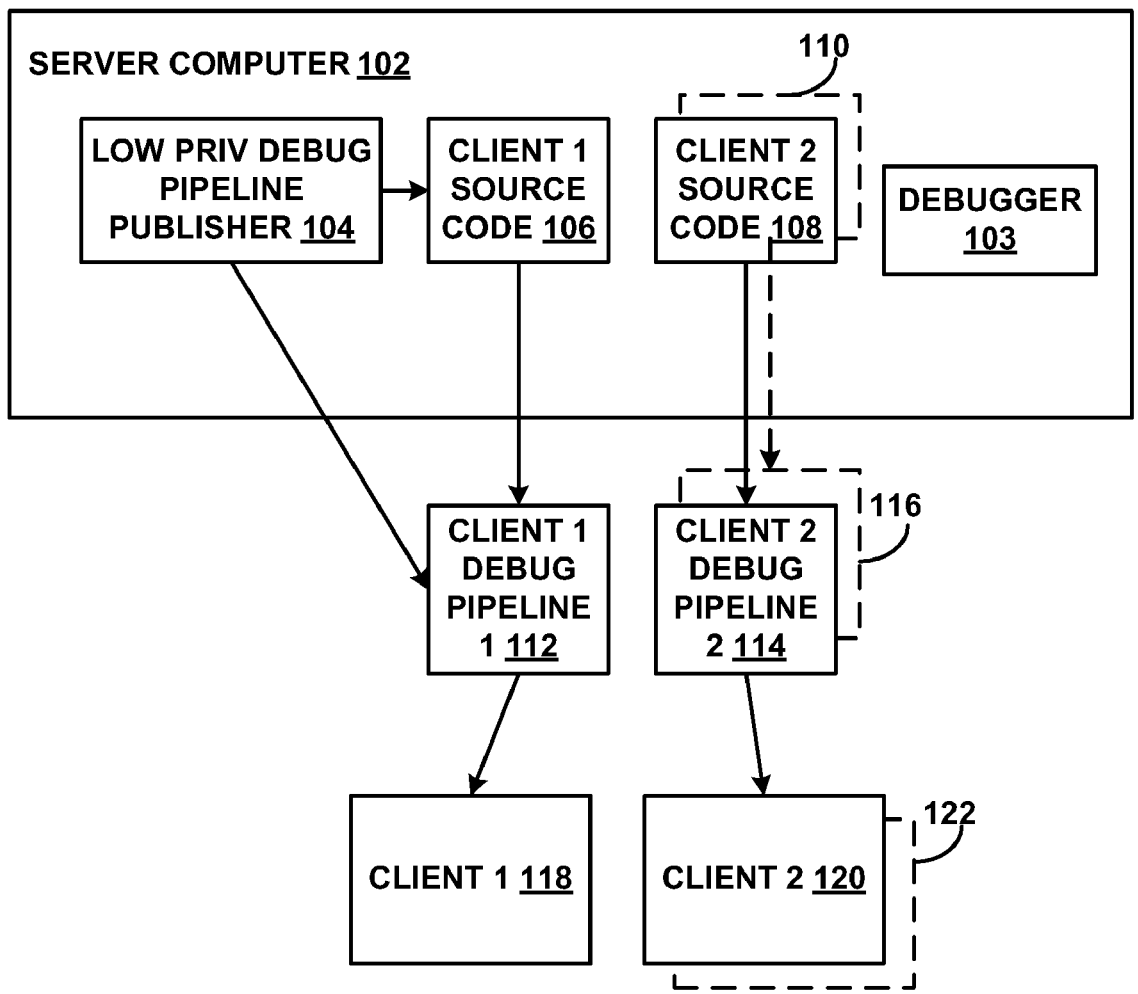
FIG. 1 is a block diagram of an example of a system for low privilege debugging in accordance with aspects of the subject matter disclosed herein.

Many modern processor architectures have CPU modes that allow the operating system to run at different privilege levels. Processes, resources and instructions which access resources are tagged with a privilege level. When a process tries to use a resource or attempts to execute a privileged instruction, the processor determines whether or not it has permission to do so, and either permits or denies the operation. This prevents user processes from damaging the operating system or other processes running on the machine. Some processors support two levels of privilege, such as user (low privilege) and supervisor (high privilege). Other processors have four levels, with level #0 having the most privileges (high privilege) and level #3 having the least privileges (level #2 and level #3 may be considered low privilege). In general, a debugger process is a high privilege process and a debuggee (the program being debugged or the debug target) is typically a low privilege process. When debugging locally, (e.g., a user is debugging a program on his own computer) it typically does not matter which of the two (debugger or debuggee) is more privileged because all the information on the computer typically belongs to the same user. Remote debugging (debugging a program running on a system accessible through a network connection) is more problematic. Remote debugging is typically performed in a client-server environment (e.g., where a client-server relationship exists).

A client-server relationship is a relationship between two computer programs running on two different computers in which one program, the client, makes a service request of another program, the server. Typical networked functions such as email exchange, web access and database access, are based on the client-server model. The term "server" in general usage refers both to the process running on the computer that services requests and to the actual computer on which the service runs. A server is typically dedicated to providing one or more services over a computer network, typically through a request-response routine. A service is typically furnished by a server application designed to handle multiple concurrent requests. Examples of server applications include mail servers, file servers, web servers, and proxy servers. A server is typically high privilege so that it can service requests and access the information it needs to access to service the requests.

A client is an application or computer that accesses a remote service on a server via a network. The client-server model is widely used on the Internet, where a user may connect to a service operating on a remote system through the internet protocol suite. A web browser is a client program (or process, i.e., a program that is executing is a process) at the user computer that can access information at any web server in the network and retrieve web pages for display on the user computer. Such a client is typically low privilege to protect confidential, privileged or sensitive information and for tamper-protection purposes.

For example, to check a bank account balance from a user computer, a web browser client process running on the user's computer can forward the user's request to a web server program at the bank. That program may in turn forward the request to its own database client program that sends a request to a database server at another bank computer to retrieve the requested account balance. The balance may be returned to the bank database client, which in turn serves it back to the web browser client on the user's computer, which can display the information to the user. The server typically is a high privilege process so that it is able to access private information (the user's bank account balance) and the client is typically a low privilege process so that other users' bank account balances remain private.

If, as occurs in remote debugging, a client (low privilege) performs a debug operation on the server, the low privilege client is performing a high privilege operation on a device (the server) that may contain highly privileged information, resulting in a potential breach of security. To clarify: suppose a company provides the infrastructure (e.g., hardware, server, storage, etc.) for an electronic commerce application. A server supporting the electronic commerce application may service a number of users and may have access to confidential customer data such as credit card numbers. Suppose a web application belonging to a client in the client-server relationship also runs on the server and the client wants to debug its client code. Suppose that the server is running one million lines of code. Of that one million lines of code suppose the client code comprises only one hundred lines of those million lines of code.

Typically, only one client can debug a process at a time. The debugger interrogates the target (the program being debugged), and has extensive control over the process. The debugger, and thus a client running the debugger, can ask for any desired information, can extract any information it wants, and can control what runs and what does not run. If a breakpoint is encountered in the code being debugged, the entire process is stopped to allow the inspection of process values at the breakpoint. This means that any other user of the process (in the example, anyone else accessing the electronic commerce application) is frozen unless and until the debugging client resumes processing. Freezing one million lines of code to enable one hundred lines of code to be debugged is not optimal. Hence the challenge is to provide an ability for the client to debug its code in a safe way, while preventing the client from taking over the server. Traditional solutions either compromise security and performance on the server to allow the client to debug on the server or prohibit the client from debugging at all on the server.

In contrast, in accordance with aspects of the subject matter disclosed herein, a debug session is scoped to just those lines of code that are client code (in the example, to the client's one hundred lines of code). The remainder of the code (in the example, the rest of the million lines of code) running on the server is not impacted and other clients utilizing the server are not affected.

Low Privilege Debugging Pipeline

FIG. 1 illustrates an example of a remote debug system 100 that enables low privilege debugging in accordance with aspects of the subject matter disclosed herein. All or portions of system 100 may reside on one or more computers such as the computers described below with respect to FIG. 4. The system 100 or portions thereof may comprise a portion of an integrated design environment 600 (IDE) such as the ones described and illustrated below with respect to FIG. 5, residing on one or more computers such as the computers described with respect to FIG. 4 also described below. Alternatively, system 100 or portions thereof may be provided as a stand-alone system or as a plug-in.

System 100 may include one or more of the following: one or more server computers 102, etc., and/or one or more client computers such as client 1 118, client 2 120, 122, etc. Server computers 102, etc. may include one or more debuggers such as debugger 103, one or more low privilege debug pipeline publishers 104, and client source code for one or more clients, (e.g., client 1 source code 106, client 2 source code 108, client source code 110 for client 3 etc). Low privilege debug pipeline publisher 104 may publish one or more debug pipelines for one or more clients so that a server program advertises a debugging pipeline instead of having a client to which a debugger has been attached interrogate the server, as in a traditional remote debug model. Low privilege debug pipeline publisher 104 may transform (apply transformations to) source code such as client 1 source code 106, client 2 source code 108, 110 etc. to make the source code cooperate with debugging services without requiring a privileged component to inspect the debuggee code, as would be required by traditional process-wide debugging techniques. That is the transformation applied to the source code may cause control to be returned to the server when a debug instruction is encountered in a remote debug session.

A low privilege debug pipeline publisher 104 running on a server computer 102 can advertise itself as a debuggee by publishing a debugging pipeline that a client debugger can consume. For example, low privilege debug pipeline publisher 104 on server computer 102 may provide a client debug pipeline for client 1 118 (e.g., client 1 debug pipeline 1 112), a client debug pipeline for client 2 120 (e.g., client 2 debug pipeline 2 114), a client debug pipeline for a third client 122, (e.g., client debug pipeline 116), and so on. Low privilege debug pipeline publisher 104 may publish client 1 debug pipeline 1 112, where client 1 debug pipeline 1 112 includes debug information only for client 1'ssource code 106 so that a debug session initiated by client 1 debugging client 1 source code 106 on server computer 102 is scoped solely to client 1's source code 106, unlike traditional models in which essentially the entire server code could be debugged by a remote client. In accordance with aspects of the subject matter disclosed herein, because debug information published by server computer 102 to client 1 118 is limited to client 1 source code 106 belonging to client 1 118, sensitive information resident on server computer 102 cannot be accessed by client 1 118. Similarly, low privilege debug pipeline publisher 104 may publish via client 2 debug pipeline 2 114 only debug information for client 2's source code so that a debug session initiated by client 2 is scoped solely to client 2's source code and so on.

Hence, a published pipeline such as client 1 debug pipeline 1 112, can describe the debuggability of client 1 source code 106, so that when a debugger 103 is attached to client 1 118, the information available to debugger 103 is restricted to the information accessible via the information published by the low privilege debug pipeline publisher 104 via client 1 debug pipeline 1 112. Similarly, client 2 debug pipeline 2 114 can describe the debuggability of client 2 source code 108, so that when a debugger 103 is attached to client 2 120, the information available to debugger 103 is restricted to the information accessible via the information published by the low privilege debug pipeline publisher 104 via client 2 debug pipeline 2 114. Hence, a client (e.g., client 1 118, client 2 120, etc.) debugging code on a server computer 102 is not able to take over the server computer 102 when a debugger 103 is attached to the client. The pipeline published by the low privilege debug pipeline publisher 104 can be transmitted over an internet protocol so the client can view debug information such as the contents of a call stack, etc., however, unlike traditional debug models, access to the debug information is controlled by a server program, on the server's terms.

Figure 2A:
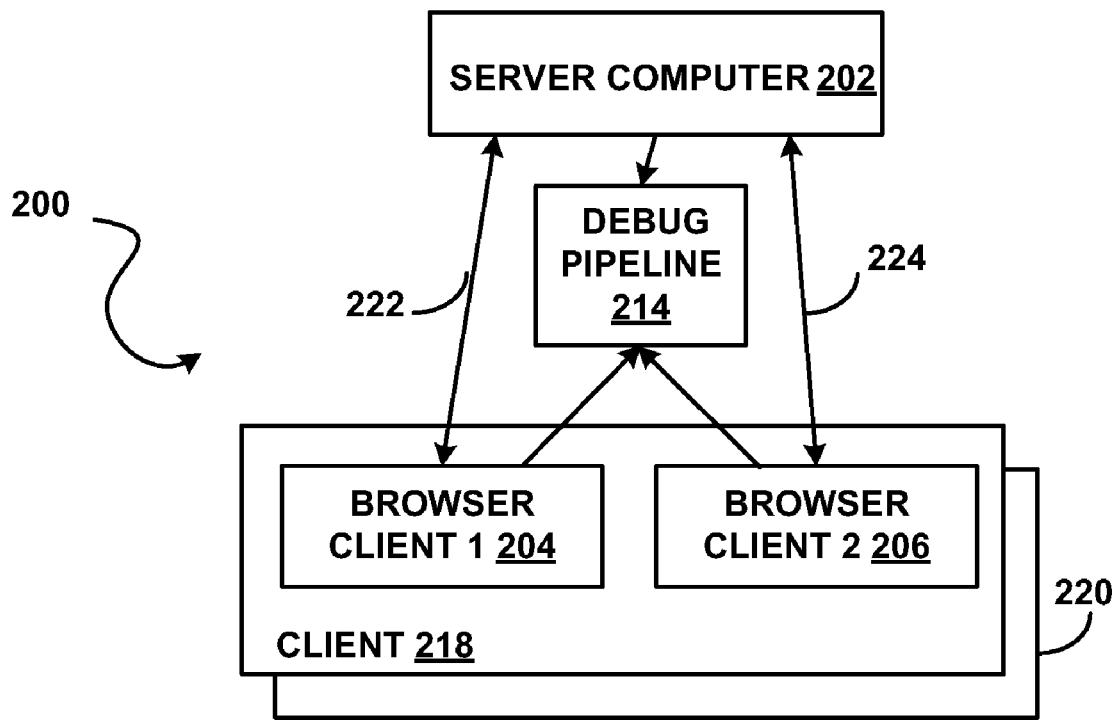
FIGS. 2a and 2b illustrate an example of a system for client-to-client low privilege debugging in accordance with aspects of the subject matter disclosed herein.
Figure 2B:
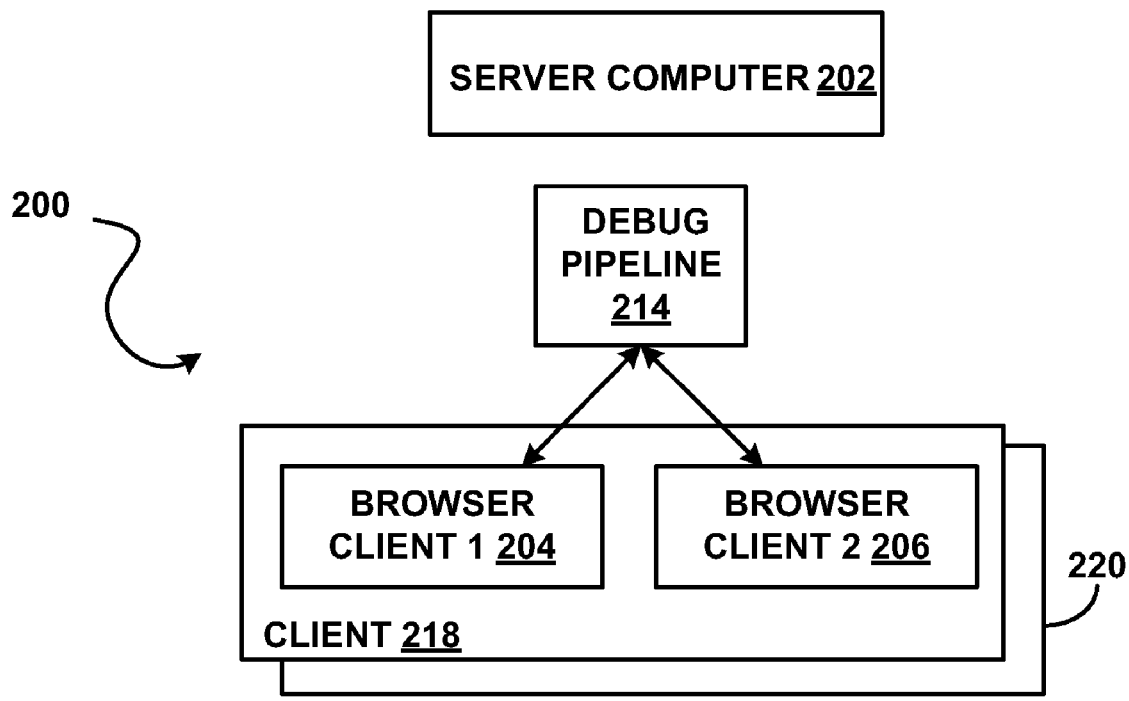

FIGS. 2a and 2b illustrate an example of a system 200 that enables low privilege debugging in accordance with other aspects of the subject matter disclosed herein. System 200 may include one or more of the following: one or more server computers such as server 202, etc., and/or one or more client computers 218, 220, etc. where each of the server or client computers may include one or more of the components described in FIG. 1 with respect to server computer 102. A client to client debugging connection may be established by connecting a first client process (e.g., browser client 1 204) to a server (e.g., server computer 202) via a first connection (e.g., internet protocol connection 222), connecting a second client process (e.g., browser client 2 206) to the server computer 202 via a second connection (e.g., internet protocol connection 224), and then removing the server from the communication channel, as shown in FIG. 2b, allowing the client processes (e.g., browser client 1 204 and browser client 2 206) to communicate directly via a low-privilege pipeline (e.g., low privilege debug pipeline 214), instead of having the first client download a privileged component that could debug the second client, as in traditional debug models.

For example, suppose an Internet user navigates to a webpage on server 202 via the user's browser (e.g., browser client 1 204) and downloads a JAVA applet or some Microsoft Silverlight code that typically runs on the client within a browser, typically a low privilege component. Suppose that application (the JAVA applet or Silverlight code) opens a second browser (e.g., browser client 2 206) so that now the client machine has two browser clients running on it. Suppose the application has a number of lines of script code running inside of it. The first browser client (e.g., browser client 204) can debug the downloaded code by publishing a low privilege debug pipeline (e.g., low privilege debug pipeline 214), just as the server low-privilege debug pipeline publisher of FIG. 1 did. The first browser client communicates back to the server 202 via the low privilege debug pipeline 214. The server 202 can forward the low privilege debug pipeline 214 to the second browser client 206. The server thus acts as a conduit between the first and second browsers on the client computer 218. The server 202 can be optimized out of the connection so that communications, instead of going from one browser on the client machine to a server and back down to the other browser on the client machine, go directly between client browsers on the client computer 218. That is, the routing of communications can be optimized so that communications are established via the low privilege debug pipeline directly between the two low-privileged browsers running on the client machine, establishing a client-to-client low privilege debug session.

Figure 3:
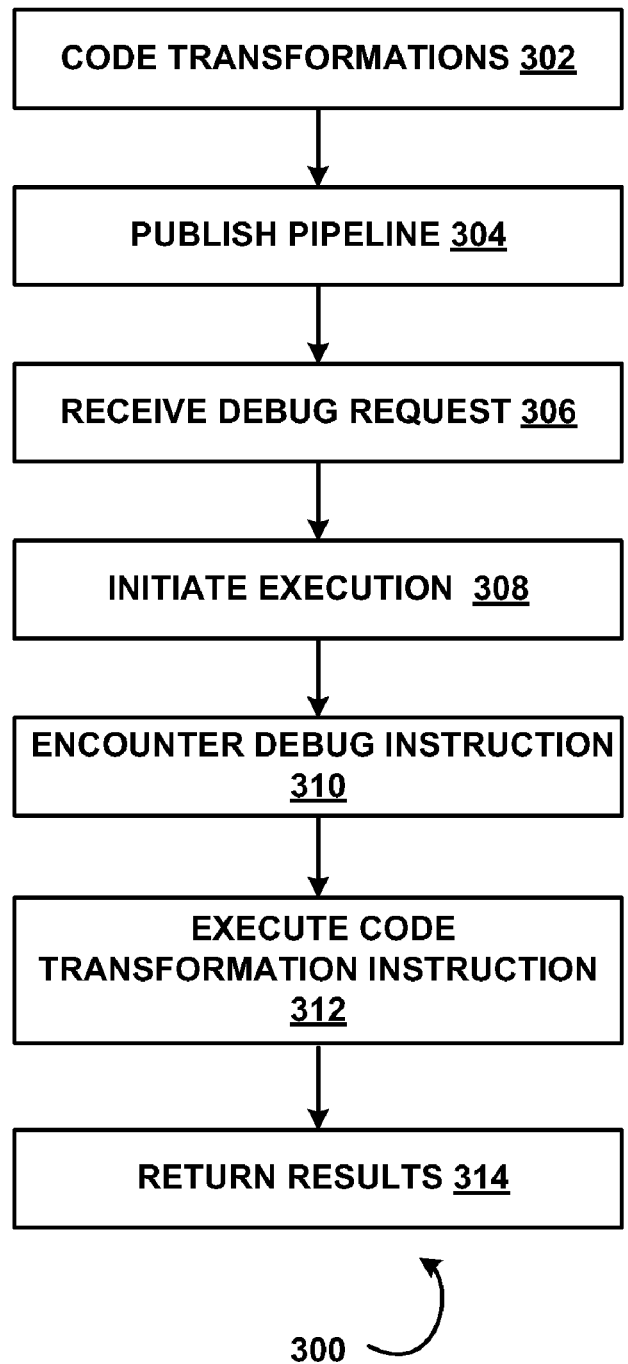
FIG. 3 is a flow diagram of a method for low privilege debugging in accordance with aspects of the subject matter disclosed herein.

FIG. 3 illustrates a method 300 for performing low privilege secure remote debugging in accordance with aspects of the subject matter disclosed herein. As described above, debugging operations performed by a debugger on the target (debuggee) include stopping (pausing) execution of a program being debugged when a breakpoint is encountered. In traditional models, when a breakpoint is encountered, execution of all threads in the process stop, and inspection of call stack and local variables is allowed. Stepping over a line of code to the next line of code is another common debug operation. In traditional debug models, a user breakpoint is implemented via a CPU breakpoint instruction which, when executed, triggers the CPU and the OS to halt the entire target process, including all threads within that process, so that a debuggee can inspect the process. Thus the debugger has complete control over the target debuggee. Thus if a client is debugging on a server, the client controls the server.

In contrast, in accordance with aspects of the subject matter disclosed herein, debugging of client code on the server is performed in a modified way so the debug operations described above do not block or control the server. Before a debug session on the server is initiated, the low privilege debug pipeline publisher may perform code transformations that when executed, halt or pause execution of client code, transfer control back to the server and allow the server to assume a state in which it can service client debug requests. Code transformations such as insertion of one or more instructions at each place in the client code at which a breakpoint or other debug instruction could be inserted. During a debug session, when a debug request is received by the server, control is returned to the server via the code transformation instruction(s). For example, when a breakpoint is encountered, the inserted instruction(s) may be executed, executing a callback to the debuggee (server). This halts execution of client code thus serving as a breakpoint in client code. Code transformation instructions inserted at a point at which no breakpoint occurs have no effect. Thus when a breakpoint is encountered in a debug session, control is returned to the server because the instruction is executed. Because control is returned to the server, the server is not blocked. Other threads executing in the process can continue, at the server's discretion. The server passes back the requested information through the low privilege debug pipeline, back to the debugger client. The low privilege debug pipeline publisher controls what code is debuggable by publishing only the information it chooses. It also controls what information is passed back to the requesting client. Hence, a server process such as the low privilege debug pipeline publisher can filter out sensitive information from the information it sends back to the requesting client. Different (client-specific) information can be published for and to each client. An authentication protocol well known in the art may be utilized to authenticate a debugger client.

Referring now to FIG. 3, at 302 before a debug session is initiated, a server process such as the low privilege debug pipeline publisher of FIGS. 1 and 2a-2b, may perform source code transformations to client code at each point in client code resident on the server at which a breakpoint or other debug instruction can be inserted. At 304 the server process can publish the debuggability of the client code to the client via a low privilege debug pipeline. At 306 a debug session of client code resident on the server can be initiated by a client via the low privilege debug pipeline. As described above, the debug session that is initiated can be scoped to client code belonging to the initiating client, as published by the server process (the low privilege debug pipeline publisher) via the low privilege debug pipeline. At 306, the server may receive a request for a debug operation. The requested debug operation may be any debug operation, as described above, such as but not limited to, "insert a breakpoint at line n". At 308, execution of the program being debugged may be initiated. At 310, a debug instruction or operation may be encountered in the code (e.g., the breakpoint at line n is reached). At 312 the code transformation instruction(s) to the server inserted at 302 may be executed. At 314, a server-controlled dialog between server and client may ensue, wherein the client requests information concerning values of the call stack and local variables and the server returns information to the client. Because the server controls the dialog, if the client requests information the server is not obligated to return the requested information. Moreover, because the server controls the process, if the client code is running on its own dedicated thread, only the dedicated thread can be frozen. The server can release locks so that other threads are not blocked. If the client code is running on its own thread, the server can release locks and block only the client thread. If the client code is not running on its own thread, the server can continue to service any other requests that come in from other clients.

If the debug session occurs between two client browsers, before the debug session is initiated, the server may optimize the routing between debugger and debuggee so that the communication channel to the server is removed. In this case, instead of the server publishing the low privilege debug pipeline and controlling the debug process, the publishing client can act as the controlling process, as described more fully above.

Example of a Suitable Computing Environment

Figure 4:
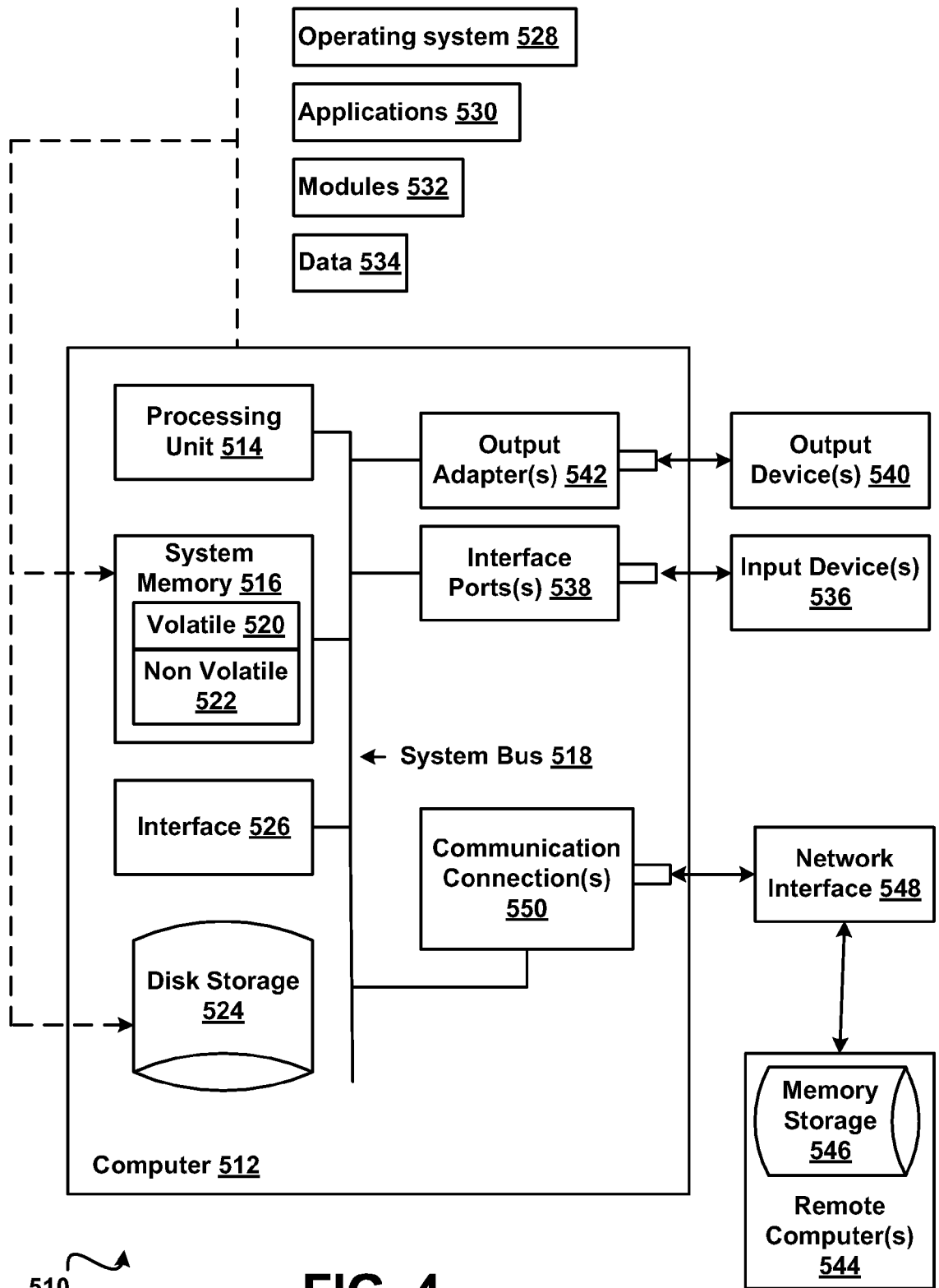
FIG. 4 is a block diagram illustrating an example of a computing environment in which aspects of the subject matter disclosed herein may be implemented.

In order to provide context for various aspects of the subject matter disclosed herein, FIG. 4 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 4, a computing device for low privilege debugging in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 4 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 5:
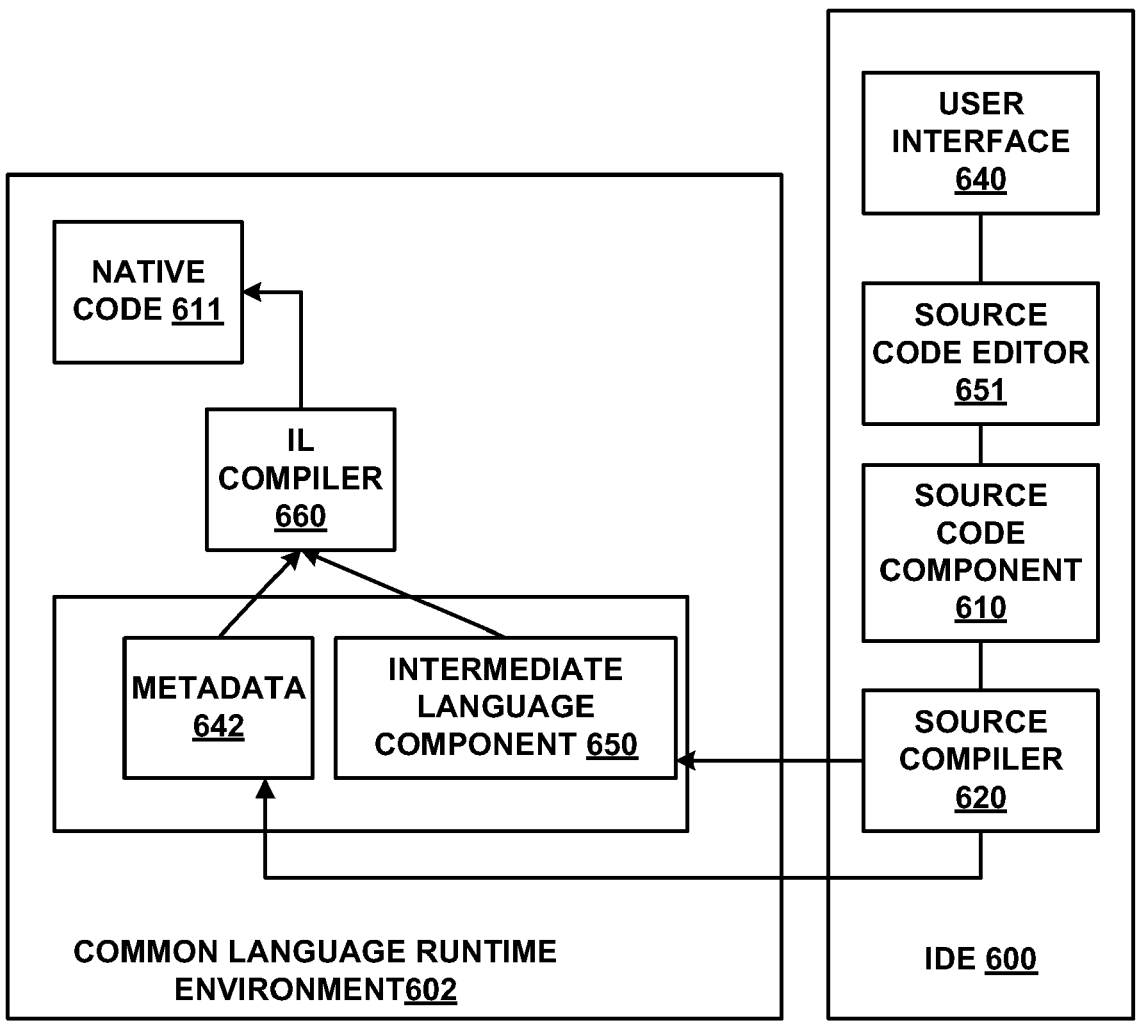
FIG. 5 is a block diagram of an example of an integrated development environment in accordance with aspects of the subject matter disclosed herein.

FIG. 5 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system that performs remote debugging securely comprising:
a computer comprising a processing unit coupled to a memory, the computer further comprising:
a low privilege debug pipeline publisher executing as a server process in a client-server environment,
the low privilege debug pipeline publisher publishing debuggability of code belonging to a client in the client-server environment via a low privilege debug pipeline, wherein a debug process isolated running on a server computer on client code resident on the server computer is isolated by publishing the low privilege debug pipeline, the client code resident on the server computer, wherein the low privilege debug pipeline publisher applies a transformation to the client code resident on the server computer, the transformation returning control to the server computer when a debug instruction in the client code is encountered in a debug session, the transformation comprising an insertion of one or more instructions at each place in the client code at which a breakpoint or other debug instruction can be inserted, wherein a debug operation resulting in a pause or stop of execution of the client code does not pause or stop execution of other client threads,
wherein a debugging session debugging the client code resident on the server computer is a low privilege process running on the server computer and is restricted to the client code resident on the server computer, wherein in response to encountering a debug instruction in the client code being debugged, control is returned to the server computer and debug information requested by the client is returned to the client via the low privilege debug pipeline, wherein the returned debug information is filtered to exclude confidential information and is limited to the client code belonging to the client.

2. The system of claim 1, wherein the client code transformation returns control to the server process at breakpoint locations in the client code.

3. The system of claim 1, wherein the low privilege debug pipeline publisher receives a debug request from the client via the low privilege debug pipeline to debug the client code resident on the server computer.

4. The system of claim 3, wherein in response to receiving the debug request from the client via the low privilege debug pipeline, the low privilege debug pipeline publisher initiates the debugging session scoped to the client code resident on the server computer.

5. A computer-readable storage medium, the computer-readable storage medium not consisting of a propagating signal, the computer-readable storage medium comprising computer-executable instructions which when executed cause a computing environment to:

isolate a debug process running on a server computer on client code resident on the server computer, wherein a debug operation resulting in a pause or stop of execution of the client code does not pause or stop execution of other client threads in the process, wherein the debug process is isolated by publishing a low privilege debug pipeline, wherein the low privilege debug pipeline limits debug information provided to a client computer to the client code belonging to the client computer, the client code resident on the server computer; and publish the low privilege debug pipeline publishing debuggability of the client code, the low privilege debug pipeline executing as a server process, wherein the low privilege debug pipeline applies a transformation to the client code resident on the server computer, the transformation returning control to the server computer when a debug instruction in the client code is encountered in a debug session, the transformation comprising an insertion of one or more instructions at each place in the client code at which a breakpoint or other debug instruction can be inserted, wherein a debugging session debugging the client code resident on the server computer is a low privilege process running on the server computer and is restricted to the client code resident on the server computer, wherein in response to encountering a debug instruction in the client code being debugged, control is returned to the server computer and debug information requested by the client is returned to the client via the low privilege debug pipeline, the returned debug information is filtered to exclude confidential information.

6. The computer-readable storage medium of claim 5, comprising further computer-executable instructions, which when executed cause the computing environment to:
wherein in response to encountering the inserted instruction, control is returned to the server computer.

7. The computer-readable storage medium of claim 5, comprising further computer-executable instructions, which when executed cause the computing environment to:
receive a debug request from the client computer via the low privilege debug pipeline, wherein, in response to receiving the debug request, a low privilege debug pipeline publisher on the server computer initiates a low privilege debug session scoped to the client code resident on the server computer.

8. The computer-readable storage medium of claim 5, comprising further computer-executable instructions, which when executed cause the computing environment to:
suspend execution of the client code while the server continues operations.

9. The computer-readable storage medium of claim 7, comprising further computer-executable instructions, which when executed cause the computing environment to:
continue to service requests from clients other than the client computer issuing the debug request.

* * * * *